July 25, 1933.  C. H. HAVILL  1,920,079

DRIVING MECHANISM

Filed March 6, 1931   2 Sheets-Sheet 1

INVENTOR
Clinton H. Havill
BY F. B. Smith
ATTORNEY

July 25, 1933.  C. H. HAVILL  1,920,079
DRIVING MECHANISM
Filed March 6, 1931   2 Sheets-Sheet 2

INVENTOR
Clinton H. Havill
BY
F. B. Smith
ATTORNEY

Patented July 25, 1933

1,920,079

UNITED STATES PATENT OFFICE

CLINTON H. HAVILL, OF SOUTH ORANGE, NEW JERSEY, ASSIGNOR TO ECLIPSE AVIATION CORPORATION, OF EAST ORANGE, NEW JERSEY, A CORPORATION OF NEW JERSEY

DRIVING MECHANISM

Application filed March 6, 1931. Serial No. 520,680.

This invention relates to driving mechanisms and more particularly to means for varying the driving ratio between the driving and driven members thereof.

An object of the invention is to provide novel means for maintaining the driven member of a driving mechanism at a constant speed of rotation, notwithstanding changes in the speed of rotation of the driving member.

A further object is to provide in a driving mechanism of the foregoing character, novel means operable in response to changes in the speed of the driving member for controlling the speed of the driven member.

A further object is to provide a driving mechanism in which the driving and driven shafts, although disposed in alignment, are nevertheless rotatable at different speeds.

Another object of the invention is to provide in a driving mechansim of the foregoing character, novel means for varying the ratio between the speed of the driving and driven members automatically in accordance with a predetermined adjustment.

Another object of the invention is to provide a driving mechanism embodying means for varying the ratio between the speed of the driving and driven members without resorting to the use of shiftable gears or similar speed changing devices. In this connection a feature of the invention is the provision of a system of gears constituting a permanent driving connection between the driving and driven members, the control means for the gears being such that upon an increase in the rate of rotation of certain of the gears, certain other gears of the system are caused to decrease their rate of rotation, although remaining meshed with the accelerated gear.

A further object of the invention is to provide a control means for a system of gears of the foregoing character in which the decreased rate of rotation of the driving gear produces an increase in the rate of rotation of the driven gears notwithstanding the meshed relation of such gears to the driving gear.

Another object of the invention is to provide in a driving mechanism of the foregoing character, novel centrifugally operated speed control mechanism operating to maintain the driven member at a constant speed within a predetermined range of speed for the driving member.

Another object of the invention is to provide novel friction controlled gear mechanism for drivably connecting a prime mover, such as an engine, with an electric generator or other member to be driven.

A further object is to provide novel means for carrying away the heat generated by the friction control means above referred to.

Another object is to provide a driving mechanism of novel construction in which the component parts are compactly and symmetrically positioned and readily accessible for inspection or repair.

Other objects and advantages to be derived from the use of the invention herein disclosed reside in the inter-relation and method of operation of the parts, and will become apparent upon inspection of the following specification when read with reference to the accompanying drawings wherein the preferred embodiment of the invention is illustrated. It is to be expressly understood, however, that the drawings are for the purpose of illustration only, and are not to be construed as a definition of the limits of the invention, reference being had for this purpose to the appended claims.

Figure 1:
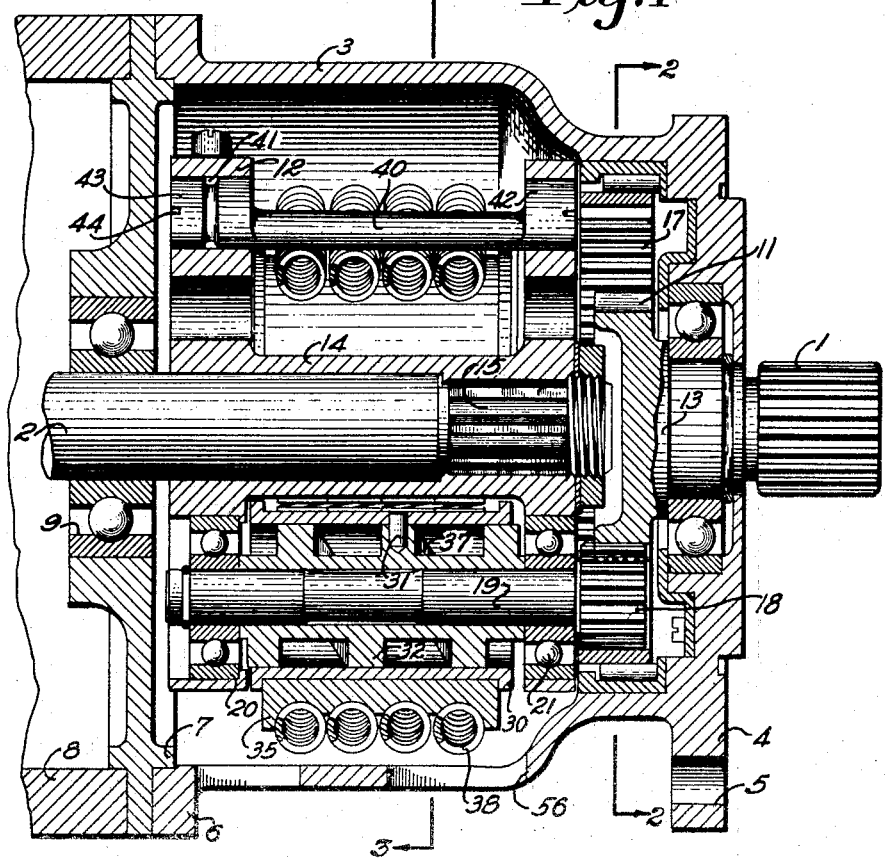
Fig. 1 is a central longitudinal section through a device embodying the invention.

Referring to the drawings, and particularly to Fig. 1, the invention is illustrated as embodied in a driving mechanism comprising a driving shaft 1, driven shaft 2, and a plurality of intermediate members of novel construction drivably connecting the members 1 and 2 and enclosed within a casing 3 having a flange 4 provided with an opening 5 through which suitable fastening means (not shown) may be inserted for attachment to a suitable support. At the opposite end the casing 3 is preferably provided with a second flange 6 to which is secured the end plate 7 which thus serves as a dividing wall between the casing 3 and the housing 8 of a generator or other device to be driven, as well as serving as a support for a ball bearing member 9 in which the driven shaft 2 is rotatably mounted.

Figure 3:
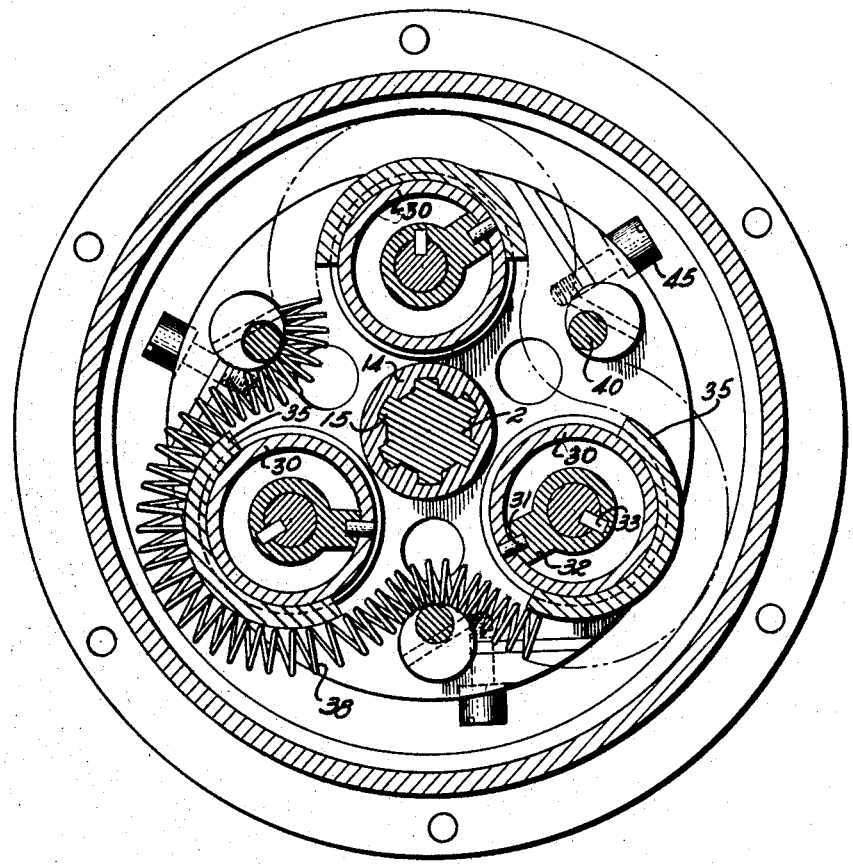
Fig. 3 is a transverse sectional view taken along the line 3—3 of Fig. 1.

As above suggested, the invention contemplates the provision of novel means for drivably connecting the shafts 1 and 2 to permit relative rotation of the two shafts through the instrumentality of novel friction controlled driving connections. Such driving connections preferably take the form of a driving pinion 11 and a driven cage or carrier 12, the former being preferably integral with the enlarged portion 13 of the driving shaft 1 and the latter being preferably provided with a sleeve 14 integral therewith and secured to the driven shaft 2 for rotation therewith by suitable means such as the spline connections indicated at 15 (Figs. 1 and 3).

Figure 2:
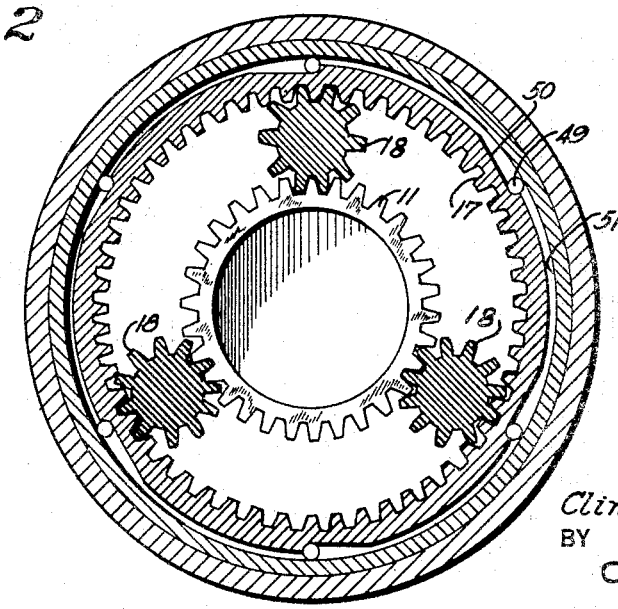
Fig. 2 is a transverse sectional view taken along the line 2—2 of Fig. 1.

The novel driving connections between the pinion 11 and the cage 12 are preferably constituted by a system of gears permanently meshed with the pinion 11 and also permanently in driving relation to the member 12. In the embodiment illustrated in the drawings, such a system of gears is of the planetary type consisting of an internally toothed or annulus gear 17 surrounding the pinion or sun gear 11 and spaced therefrom by the provision of a plurality of planet gears 18, as shown best in Fig. 2, the said planet gears being adapted to remain permanently meshed with sun gear 11 on the one hand and with the annulus gear 17 on the other; the latter gear having associated therewith a one-way wedging clutch mechanism, to be described, permitting free rotation thereof in one direction only and positively preventing its rotation in the opposite direction.

The preferred means for effecting driving connection between the planetary gears just described and the cage or carrier 12, consists in providing each of the planet gears 18 with a longitudinally extending shaft 19 extending through suitable openings provided in the carrier 12, each being preferably provided with ball bearings 20 and 21 (Fig. 1) to facilitate rotation thereof with respect to the carrier 12.

From the foregoing it is apparent that rotation of the driving shaft 1 will cause a corresponding rotation of the driven shaft 2 through the driving connections established by the provision of pinion 11, planet gears 18, shafts 19, cage or carrier 12, and sleeve 14, the latter being splined to the driven shaft. It will also be apparent that the rate of rotation of the driven shaft 2 produced by the means just iterated will depend upon two factors; first, the rate of rotation of the driving shaft 1 (and hence of the pinion 11) and secondly, the rate of rotation, if any, of the planet gears 18 about their individual axes. Accordingly, the planet gears 18 are preferably made readily rotatable about their own axes while the annulus gear 17 is restrained by the wedging clutch to be described, so as to remain relatively stationary, whereby rotation of pinion 11 will produce rotation of the planet gears 18 not only about the central axis, but also about their individual axes. Such operation will produce a relatively slow speed of rotation of the driven shaft 2 in comparison with the rotation of the driving shaft 1.

On the other hand, by providing resistance tending to prevent rotation of planet gears 18 about their individual axes while permitting free rotation of the annulus gear 17 in one direction, such resistance will cause the planet gears 18 and the annulus gear 17 to rotate with the pinion in such one direction, and without any relative rotation therebetween. It follows that under such conditions the driving ratio between the speed of the rotation of shafts 1 and 2 will be considerably smaller than—as shown, one to one—under the conditions previously discussed and will be a constant ratio.

It will also be evident that by providing means for alternately applying and removing resistance to the rotation of the planet gears 18, the driving ratio can be made to change in accordance with changes in the speed of driving mechanism, and thereby maintain the driven shaft 2 at constant speed (within practical limits) notwithstanding variations in the speed of the rotation of driving shaft 1. The present invention provides means for achieving the foregoing results. Such means will now be described.

The novel means for controlling the resistance opposing rotation of the planet gears 18 about their individual axes, and thereby varying the driving ratio between the members 1 and 2, preferably comprises the provision of friction members in combination with resilient means holding said friction members in proper position with a degree of tension which varies in accordance with the speed of the driving mechanism. In the preferred embodiment as shown, such means preferably includes the provision of a plurality of sleeves or drums 30, there being one such drum surrounding each shaft 19, the drums 30 being preferably keyed, as indicated at 31 (Figs. 1 and 3) to an inner sleeve 32 which is in turn keyed or otherwise rigidly secured to the corresponding shaft 19 as indicated at 33 on Fig. 3.

Associated with each drum 30 is an arcuate band or segment 35 (Figs. 1 and 3)

adapted to exert a variable frictional pressure on the corresponding drum 30 and, through the connection just referred to, on the shaft 19, the pressure being produced by the provision of suitable resilient means which, as illustrated, take the form of a plurality of coiled springs 38 extending completely around the assembly and adapted to be held in resilient contact with each of the segments 35 by suitable means such as the pins 40 extending longitudinally of the assembly at points spaced between the members 35, the pins 40 being suitably secured in the flanges formed on the carrier 12, in which flanges suitable apertures 41 and 42 (Fig. 1) are provided for this purpose. The positions of these shafts with respect to the springs 38, are preferably made adjustable by the provision of eccentric heads 43 provided with grooves 44 for insertion of a screw driver or other suitable means for changing the angular position thereof and thereby changing the effective tension of the spring 38, suitable screws 45 being provided to maintain the shafts in adjusted position.

By the use of the means above described, it is apparent that an adjustable amount of friction is yieldably exerted upon each gear shaft 19, which friction tends to resist rotation of the gears 18 about their individual axes and therefore tends to cause rotation of annulus gear 17, gears 19 and pinion 11 in unison in response to actuation of the driving shaft 1. It will also be apparent that the amount of such friction will be reduced whenever the shaft 2 is accelerated, since such acceleration produces an increasing centrifugal action tending to move the segments 35 outward, thereby relieving to a certain extend the pressure exerted by the springs 38 on the drums 21. The resulting decreased friction will permit a corresponding degree of rotation of the gears 18 about their own axes, and relatively to the annulus gear 17 (rotation of the latter being restrained by the clutch means to be described) and the speed of the carrier 12 and driven shaft 2 will be correspondingly decreased. By suitable tensioning springs 38 it is evident that the variation in the driving ratio may be made to depend upon variations in speed of the driving shaft 2 in proper proportion to tend to bring the driven shaft 2 back to a constant predetermined speed immediately following any increment or decrement in the speed of the driving shaft 1.

The one-way wedging clutch means above referred to is preferably constituted by a plurality of rollers 49 disposed in tapering recesses 50 provided at intervals around the circumference of gear 17 and extending into the clearance provided between the said gear and the cylindrical sleeve 51 on the housing. With this construction it is apparent that as long as the driving shaft 1 rotates at a constant speed in a counter-clockwise direction as viewed in Fig. 2, the assembly of planet gears and annulus gear 17 will rotate therewith, and in view of the complete absence of rotation of the planet gears about their individual axes, the sleeve 14 and hence the driven shaft 2 will rotate at the same constant speed as that of the driving shaft 1.

In the event, however, of an increase in the speed of rotation of the driving shaft 1, the resulting increase in centrifugal force will relieve the pressure of the segments 35 on the drums 30 thereby permitting ready rotation of the gears 18 about their individual axes. Such rotation will tend to drive the annulus gear 17 in a clockwise direction, whereupon the rollers 49 become effective to prevent any such rotation, with the result that the planet gears 18 travel along the annulus gear 17 and about the axis of the gear 11, but at a considerably reduced speed. The resultant decrease in centrifugal force permits the reapplication of sufficient frictional pressure on the drums 30 to reduce the rate of rotation of the planet gears 18 about their individual axes and thereby cause return of the driven member 2 to its predetermined constant speed. This operation will be repeated on every occasion when the said driven member deviates (within practical limits) from such predetermined constant speed. Hence, it is apparent that on every tendency toward a change in the speed of the driven member 2, the controlling mechanism will come into action to nullify such tendency and thereby maintain the driven shaft 2 at the predetermined constant speed.

Novel means are provided for ventilating the assembly and removing the heat generated by the friction of the parts, particularly the surface of the members 30. As shown best in Fig. 1 such means comprises the provision of one or more openings 56 in the housing, through which air is drawn into the spiral groove or thread 37 provided on the surface of each of the sleeves 32. As a result of this construction, the rotation of the sleeves 32 with the shaft 19 creates an air propelling device which presents a constantly changing supply of cooling air to the surfaces of the members 30, the air being expelled from the housing through suitable openings.

There is thus provided a novel driving mechanism which is effective to maintain a driven member at constant speed, within desired limits, by the use of a compact symmetrically arranged mechanism which entails the use of comparatively few parts, which is relatively inexpensive to manufacture, readily assembled or dissassembled, and which possesses the further desirable quality that it can be adapted to a variety of uses and applications. Thus, for example, although especially useful for driving a generator or other dynamo electric machine or accessory of an automotive vehicle, it may also be applied as a drive for any machinery where a constant speed is desirable and where the prime mover is subject to variations in speed.

Moreover, the invention may be utilized as a variable ratio driving mechanism with or without the constant speed feature, and in combination with manually operable means for regulating the pressure on the shafts 19.

It is further evident that by providing means for varying the amount of resistance to rotation of the planet gears 18 about their individual axes, there may be obtained an infinite number of conditions between the one extreme of complete absence of rotation of the planet gears 18 about their own axes, and the other extreme of complete absence of rotation of the annulus gear 17, and that for each of such intermediate conditions a different driving ratio will be obtained.

While the embodiment of the invention herein illustrated possesses a high degree of merit from a practical as well as from other viewpoints, it is nevertheless contemplated that changes in construction and arrangement of parts will suggest themselves to persons skilled in the art in the light of the foregoing disclosure, and it is to be understood that such means are within the scope of the invention herein disclosed.

Likewise other changes may be made in the form, details of construction, arrangement of parts and the uses to which they are applied, without departing from the spirit of the invention, or the scope of the appended claims.

What is claimed is:

1. In a device of the character described, a driving member, a driven member, means for maintaining driving relation between said members to cause rotation of said driven member at a predetermined speed, said means including a gear train interposed between said driving and driven members, said gear train comprising a driving gear and a second gear constantly meshed with said driving gear but rotatable relatively to said driving gear and a third gear constantly meshed with said second gear but out of the line of torque transmission, and means including a friction device acting to restrain rotation of said second gear about its own axis as long as the speed of rotation of said driving gear remains below a predetermined limit.

2. In a device of the character described, a driving member, a driven member, means for maintaining driving relation between said members to cause rotation of said driven member at a predetermined speed, said means including a gear rotatable about two parallel axes, and means including a friction device acting to restrain rotation of said gear about one of said axes as long as the speed of rotation of said gear about the axis of said driving member remains below a predetermined limit.

3. In a device of the character described, a driving member, a driven member, means for maintaining driving relation between said members to cause rotation of said driven member at a predetermined speed, said means including a gear constantly rotatable with said driving member, a second gear constantly meshed with said first named gear but rotatable therewith only during rotation of said driving member within predetermined speed limits, and means including a friction device acting to restrain rotation of said second gear about its own axis as long as the speed of rotation of said driving member remains within said predetermined limits.

4. In a device of the character described, a driving member, a driven member, means for maintaining driving relation between said members to cause rotation of said driven member at a predetermined speed, said means including a plurality of gears drivably connected with said members, friction exerting devices individual to said gears for retarding the degree of rotation of said gears about their respective axes, a gear having engagement with each of said driving members but locked against rotation therewith as long as the latter rotate about their respective individual axes, and unitary means common to all said friction devices for controlling the friction exerted by said device in accordance with variations in the speed of rotation of said driving member.

5. A driving mechanism comprising a plurality of driving shafts, a cylindrical carrier for said shafts, said carrier being rotatable in response to rotation of said shafts, means for rotating said shafts in unison about the axis of said cylindrical carrier comprising a gear on each of said shafts and a reaction gear adapted to mesh constantly with each of said gears, and means for controlling rotation of said shafts about their individual axes in response to changes in speed of rotation of said driving gear, said last named means comprising a one-way clutch mechanism engaging said reaction gear and a friction exerting device engageable with each of said shafts and centrifugally responsive means for varying the amount of friction exerted by said device on said shafts.

6. A driving mechanism comprising a plurality of driving shafts, a cylindrical carrier for said shafts, said carrier being rotatable in response to rotation of said shafts, means for rotating said shafts in unison about the axis of said cylindrical carrier comprising a gear on each of said shafts and a driving gear adapted to mesh constantly with each of said gears, and means for varying the degree of rotation of said shafts about their individual axes in response to changes in speed of rotation of said driving gear, said last named means comprising a friction exerting device engageable with each of said shafts and centrifugally responsive means for varying the amount of friction exerted by said device on said shafts, and means for removing the heat generated by operation of said friction exerting device.

7. A driving mechanism comprising a plurality of driving shafts, a cylindrical carrier for said shafts, said carrier being rotatable in response to rotation of said shafts, means for rotating said shafts in unison about the axis of said cylindrical carrier comprising a gear on each of said shafts and a driving gear adapted to mesh constantly with each of said gears, means for varying the degree of rotation of said shafts about their individual axes in response to changes in speed of rotation of said driving gear, said last named means comprising a friction exerting device engageable with each of said shafts and centrifugally responsive means for controlling the amount of friction exerted by said device on said shafts, and a one-way clutch mechanism cooperating with said friction exerting device to facilitate rotation of said shafts about their individual axes on release of said friction exerting device.

CLINTON H. HAVILL.